United States Patent
Lisio et al.

(10) Patent No.: US 10,683,099 B2
(45) Date of Patent: Jun. 16, 2020

(54) METHODS AND SYSTEMS FOR CONTROLLING OPERATION OF AIRCRAFT ENGINES

(71) Applicant: PRATT & WHITNEY CANADA CORP., Longueuil (CA)

(72) Inventors: Carmine Lisio, Laval (CA); Michel Labrecque, St-Bruno (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 236 days.

(21) Appl. No.: 15/427,162

(22) Filed: Feb. 8, 2017

(65) Prior Publication Data

US 2018/0222596 A1 Aug. 9, 2018

(51) Int. Cl.
| | |
|---|---|
| B64D 31/00 | (2006.01) |
| F02C 3/04 | (2006.01) |
| B64D 35/00 | (2006.01) |
| B64D 27/10 | (2006.01) |
| F02C 9/00 | (2006.01) |
| B64D 31/06 | (2006.01) |
| F02C 9/58 | (2006.01) |

(52) U.S. Cl.
CPC ............ *B64D 31/00* (2013.01); *B64D 27/10* (2013.01); *B64D 31/06* (2013.01); *B64D 35/00* (2013.01); *F02C 3/04* (2013.01); *F02C 9/00* (2013.01); *F02C 9/58* (2013.01); *F05D 2220/323* (2013.01); *F05D 2270/05* (2013.01); *F05D 2270/114* (2013.01)

(58) Field of Classification Search
CPC ........ B64D 31/00; B64D 35/00; B64D 27/10; F02C 3/04; F02C 9/00; F02C 9/58
See application file for complete search history.

(56) References Cited

U.S. PATENT DOCUMENTS

| | | |
|---|---|---|
| 4,772,180 A | 9/1988 | Walker et al. |
| 5,213,471 A | 5/1993 | Miller et al. |
| 5,416,699 A | 5/1995 | DiValentin et al. |

(Continued)

FOREIGN PATENT DOCUMENTS

| | | |
|---|---|---|
| EP | 1491745 | 11/2008 |
| WO | 20150053930 | 4/2015 |

OTHER PUBLICATIONS

Povazan J et al: "Introduction to advanced modeling and control of turbo-prop engines", Intelligent Engineering Systems (INES), 2012 IEEE 16th International Conference on, IEEE, Jun. 13, 2012 (Jun. 13, 2012), pp. 271-277, XP032211307, DOI: 10.1109/INES.2012.6249843 ISBN: 978-1-4673-2694-0.

(Continued)

*Primary Examiner* — Ramsey Refai
(74) *Attorney, Agent, or Firm* — Norton Rose Fulbright Canada LLP

(57) ABSTRACT

The present disclosure provides a method and a system for controlling operation of an engine of an aircraft. A first engine power limit associated with a thrust limit for a propeller coupled to the engine is obtained. The first engine power limit is compared to a second engine power limit associated with a mechanical limit for the engine and to a third engine power limit associated with a thermal limit for the engine. A maximum engine power limit is set at a lowest value of the first, second, and third engine power limits.

20 Claims, 8 Drawing Sheets

(56) References Cited

U.S. PATENT DOCUMENTS

| | | | |
|---|---|---|---|
| 6,282,882 B1 | 9/2001 | Dudd, Jr. et al. | |
| 6,468,035 B1* | 10/2002 | Otake | B64C 11/305 |
| | | | 123/436 |
| 6,748,744 B2 | 6/2004 | Peplow et al. | |
| 6,808,141 B2 | 10/2004 | Bretscher et al. | |
| 7,212,942 B2* | 5/2007 | Vollum | G01L 3/24 |
| | | | 702/127 |
| 7,322,178 B2* | 1/2008 | Simoni | G01C 23/00 |
| | | | 60/39.281 |
| 7,414,544 B2* | 8/2008 | Oltheten | G01D 7/002 |
| | | | 340/946 |
| 7,471,996 B2 | 12/2008 | Bartel | |
| 8,255,140 B2 | 8/2012 | Sutschek et al. | |
| 8,414,260 B2* | 4/2013 | Johnson | F02C 9/28 |
| | | | 244/175 |
| 8,442,740 B2 | 5/2013 | Rossotto | |
| 8,566,000 B2 | 10/2013 | Lickfold et al. | |
| 8,651,811 B2 | 2/2014 | Danielson | |
| 9,002,616 B2 | 4/2015 | Genevrier et al. | |
| 9,008,943 B2 | 4/2015 | Lickfold et al. | |
| 9,157,377 B2 | 10/2015 | Lickfold et al. | |
| 9,500,137 B2 | 11/2016 | Haillot | |
| 9,541,028 B2 | 1/2017 | McVey | |
| 2004/0267414 A1* | 12/2004 | Bartel | F02C 9/00 |
| | | | 701/4 |
| 2008/0019804 A1 | 1/2008 | Toyoda | |
| 2008/0029653 A1* | 2/2008 | Johnson | F02C 9/28 |
| | | | 244/175 |
| 2008/0249671 A1* | 10/2008 | Remy | F02C 9/28 |
| | | | 701/3 |
| 2009/0306839 A1* | 12/2009 | Youngquist | G01K 7/021 |
| | | | 701/14 |
| 2011/0208400 A1* | 8/2011 | Lickfold | F02C 9/32 |
| | | | 701/100 |
| 2014/0271117 A1 | 9/2014 | Armstrong et al. | |
| 2015/0211422 A1 | 7/2015 | Lickfold et al. | |
| 2016/0123232 A1 | 5/2016 | Wright et al. | |
| 2016/0207633 A1* | 7/2016 | McWaters | B64D 27/04 |
| 2016/0251977 A1 | 9/2016 | Gates et al. | |
| 2016/0265445 A1 | 9/2016 | Fiedler et al. | |
| 2016/0273379 A1 | 9/2016 | Soares, Jr. et al. | |
| 2016/0298486 A1 | 10/2016 | Langford et al. | |

OTHER PUBLICATIONS

European Patent Office, European Search Report, dated Mar. 21, 2018, pp. 2-3, Application No. EP 18155860.

* cited by examiner

METHODS AND SYSTEMS FOR CONTROLLING OPERATION OF AIRCRAFT ENGINES

TECHNICAL FIELD

The present disclosure relates generally to engine control, and, more particularly, to limiting power in aircraft engines.

BACKGROUND OF THE ART

A propeller driven aircraft power-plant consists of two distinct components: an engine and a propeller. Controls and limits on a maximum engine output power are designed to observe engine-related limits, such as mechanical flat ratings and thermal or turbine temperature related limiting. Propeller systems are designed to absorb a torque provided by the engine by modulating propeller conditions, such as a propeller blade pitch, and to convert this torque into thrust for the aircraft.

However, engine output power generation does not consider any propeller-related constraints when modulating engine output power generation.

As such, there is room for improvement.

SUMMARY

In another aspect, there is provided a method for controlling operation of an engine of an aircraft. A first engine power limit associated with a thrust limit for a propeller coupled to the engine is obtained. The first engine power limit is compared to a second engine power limit associated with a mechanical limit for the engine and to a third engine power limit associated with a thermal limit for the engine. A maximum engine power limit is set at a lowest value of the first, second, and third engine power limits.

In some embodiments, the method further comprises applying the engine power limit to the engine.

In some embodiments, obtaining the first engine power limit comprises obtaining the thrust limit from a propeller control system.

In some embodiments, obtaining the first engine power limit comprises obtaining an engine output power for the engine while in operation; and determining the first engine power limit based on the engine output power and at least one external aircraft condition.

In some embodiments, the at least one external aircraft condition comprises at least one of a forward airspeed, an operating altitude, and an ambient temperature.

In some embodiments, the method further comprises receiving at least one propeller operation condition, wherein determining the first engine power limit is based on the engine output power, the at least one external aircraft condition, and the at least one propeller operation condition.

In some embodiments, the at least one propeller operation condition comprises at least one of a propeller rotational speed, a propeller blade pitch angle, and a propeller blade efficiency.

In some embodiments, obtaining the engine output power comprises obtaining, at an engine control system, the engine output power from a propeller control system, wherein the determining, comparing, and setting is performed by the engine control system.

In some embodiments, the method further comprises determining at least one of the second and third engine power limits from a lookup table based on at least one external aircraft condition.

In some embodiments, determining at least one of the second and third engine power limits comprises dynamically determining the third power limit based on changes to the at least one external aircraft condition.

In some embodiments, the method further comprises obtaining an updated first engine power limit; comparing the updated first engine power limit to the second and third engine power limits; and setting the maximum engine power limit at a lowest value of the updated first engine power limit, the second engine power limit, and the third engine power limit.

In a further aspect, there is provided a system for controlling operation of an engine of an aircraft. The system comprises a processing unit and a non-transitory computer-readable memory. The memory has stored thereon program instructions executable by the processing unit for: obtaining a first engine power limit associated with a thrust limit for a propeller coupled to the engine; comparing the first engine power limit to a second engine power limit associated with a mechanical limit for the engine and to a third engine power limit associated with a thermal limit for the engine; and setting a maximum engine power limit at a lowest value of the first, second, and third engine power limits.

In some embodiments, the method further comprises applying the engine power limit to the engine.

In some embodiments, obtaining the first engine power limit comprises obtaining the thrust limit from a propeller control system.

In some embodiments, obtaining the first engine power limit comprises: obtaining an engine output power for the engine while in operation; and determining the first engine power limit based on the engine output power and at least one external aircraft condition.

In some embodiments, the at least one external aircraft condition comprises at least one of a forward airspeed, an operating altitude, and an ambient temperature In some embodiments, the program instructions are further executable by the processing unit for receiving at least one propeller operation condition, wherein determining the first engine power limit is based on the engine output power, the at least one external aircraft condition, and the at least one propeller operation condition.

In some embodiments, the at least one propeller operation condition comprises at least one of a propeller rotational speed, a propeller blade pitch angle, and a propeller blade efficiency.

In some embodiments, obtaining the engine output power comprises obtaining, at an engine control system, the engine output power from a propeller control system, wherein the determining, comparing, and setting is performed by the engine control system.

In some embodiments, the program instructions are further executable by the processing unit for determining at least one of the second and third engine power limits from a lookup table based on at least one external aircraft condition.

In some embodiments, determining at least one of the second and third engine power limits comprises dynamically determining the third engine power limit based on changes to the at least one external aircraft condition.

In some embodiments, the program instructions are further executable by the processing unit for obtaining an updated first engine power limit for the engine; comparing the updated first engine power limit to the second and third engine power limits; and setting the maximum engine power limit at a lowest value of the updated first engine power limit, the second engine power limit, and the third engine power limit.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
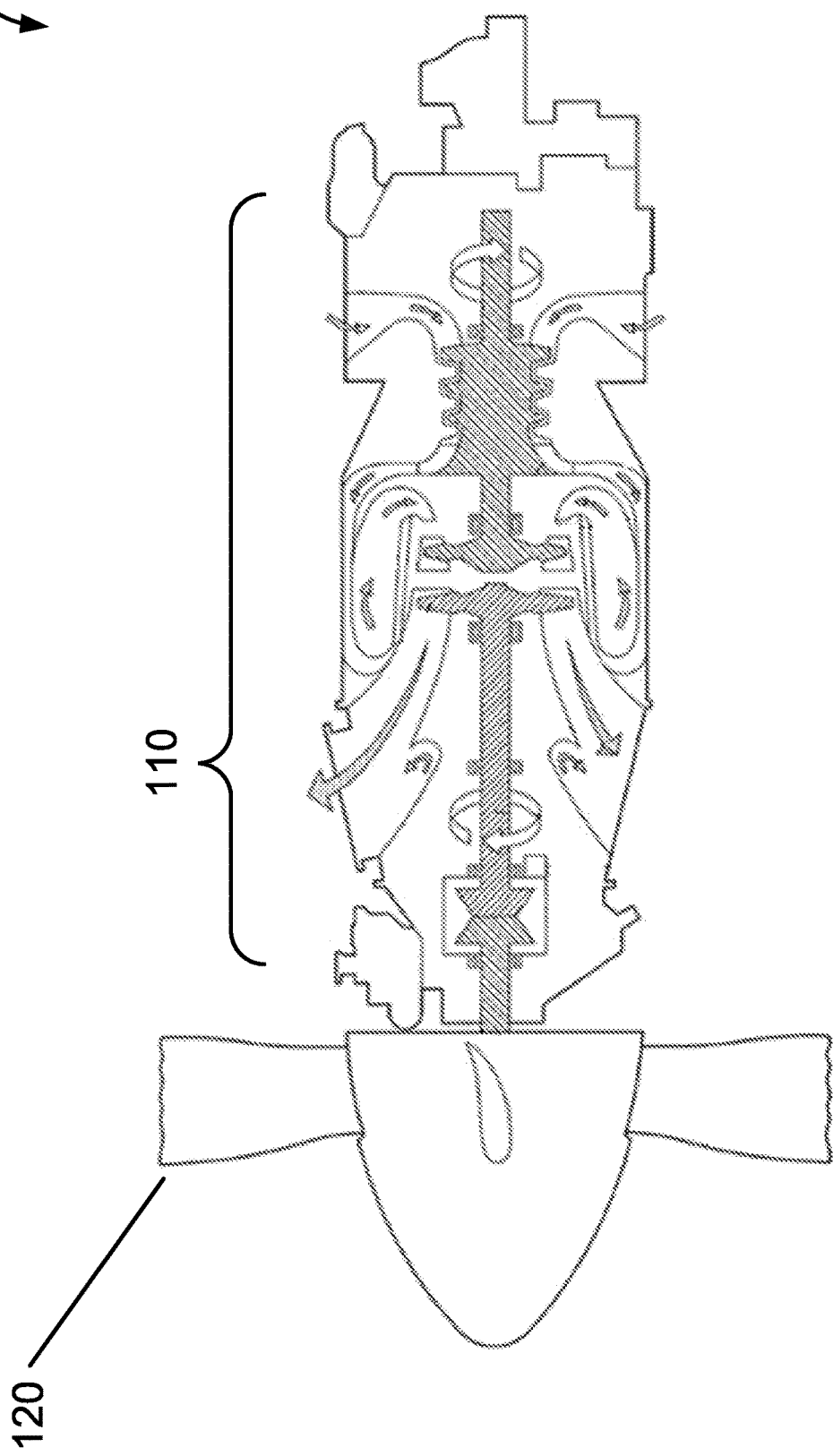
FIG. 1 is a schematic cross-sectional view of an example powerplant of a propeller driven aircraft.

With reference to FIG. 1, there is illustrated a power-plant 100 for an aircraft of a type preferably provided for use in subsonic flight, generally comprising an engine 110 and a propeller 120. In certain embodiments, the engine 110 generally comprises in serial flow communication a fan through which ambient air is propelled, a compressor section for pressurizing the air, a combustor in which the compressed air is mixed with fuel and ignited for generating an annular stream of hot combustion gases, and a turbine section for extracting energy from the combustion gases. The propeller 120 is caused to rotate by the turbine section, and rotation of the propeller 120 generates thrust which propels the aircraft in a given direction.

Control of the operation of the engine 110 is dependent on a number of factors, including mechanical and thermal limitations of the engine 110. For example, certain elements of the engine 110 are rated to operate within a certain temperature range, and if the temperature of the engine approaches an upper bound of the range, operation of the engine can be constrained. Similarly, the engine 110 has various mechanical limits which constrain the engine 110 to a maximum engine output power. In addition, the propeller 120 imposes additional constraints on the operation of the engine 110, namely a limit above which the thrust produced by the propeller 120 can cause damage to the propeller 120 itself. The present disclosure provides methods and systems for controlling the operation of the engine 110 while taking into account an engine power limit associated with a thrust limit imposed by the propeller 120. More specifically, a mechanism for limiting the output power of the engine to the lowest of an engine power limit associated with a mechanical limit for the engine 110, an engine power limit associated with a thermal limit for the engine 110, and the engine power limit associated with the thrust limit for the propeller 120, ensuring that the engine 110 does not operate at a level which could cause mechanical or thermal damage to the engine 110 itself, or damage to the propeller 120 by generating thrust at a level beyond what the propeller 120 can withstand With reference to FIG. 2A, a powerplant control system 200 is shown as comprising an engine controller 210 and a propeller controller 220. The powerplant control system 200 is configured for controlling operation of the engine 110. More specifically, the engine controller 210 includes an engine output power controller 230 which is configured for limiting an output power provided by the engine 110. Although depicted as part of the engine controller 210 in FIG. 2A, in other embodiments the engine output power controller 230 may be a part of the propeller controller 220, may be a separate entity 230 disposed between the propeller controller 220 and the engine controller 210, or a combination thereof.

The engine controller 210 is configured for controlling the operation of the engine 110. More specifically, the engine controller 210 is configured for issuing to the engine 110 any signals suitable for controlling operation of the engine 110, such as fuel control signals, speed control signals, valve control signals, and the like. In some embodiments, the engine controller 210 is a full-authority digital engine control (FADEC), an electronic engine controller (EEC), an engine control unit (ECU), or any other suitable engine controller.

The propeller controller 220 interfaces the engine controller 210 and the propeller 120 and is configured for controlling operation of the propeller 220, for example by controlling oil flow to a blade pitch control unit (not illustrated) of the propeller 120. In some embodiments, the propeller controller 220 is configured for controlling various propeller operation conditions, including a propeller blade pitch. The propeller controller 220 is also configured for obtaining information about other propeller operation conditions, including a propeller rotational speed and a propeller blade pitch angle. Propeller operation conditions are understood to include a propeller rotational speed, a propeller blade pitch angle, a propeller blade efficiency, or other relevant propeller-related operation conditions.

Figure 2A:
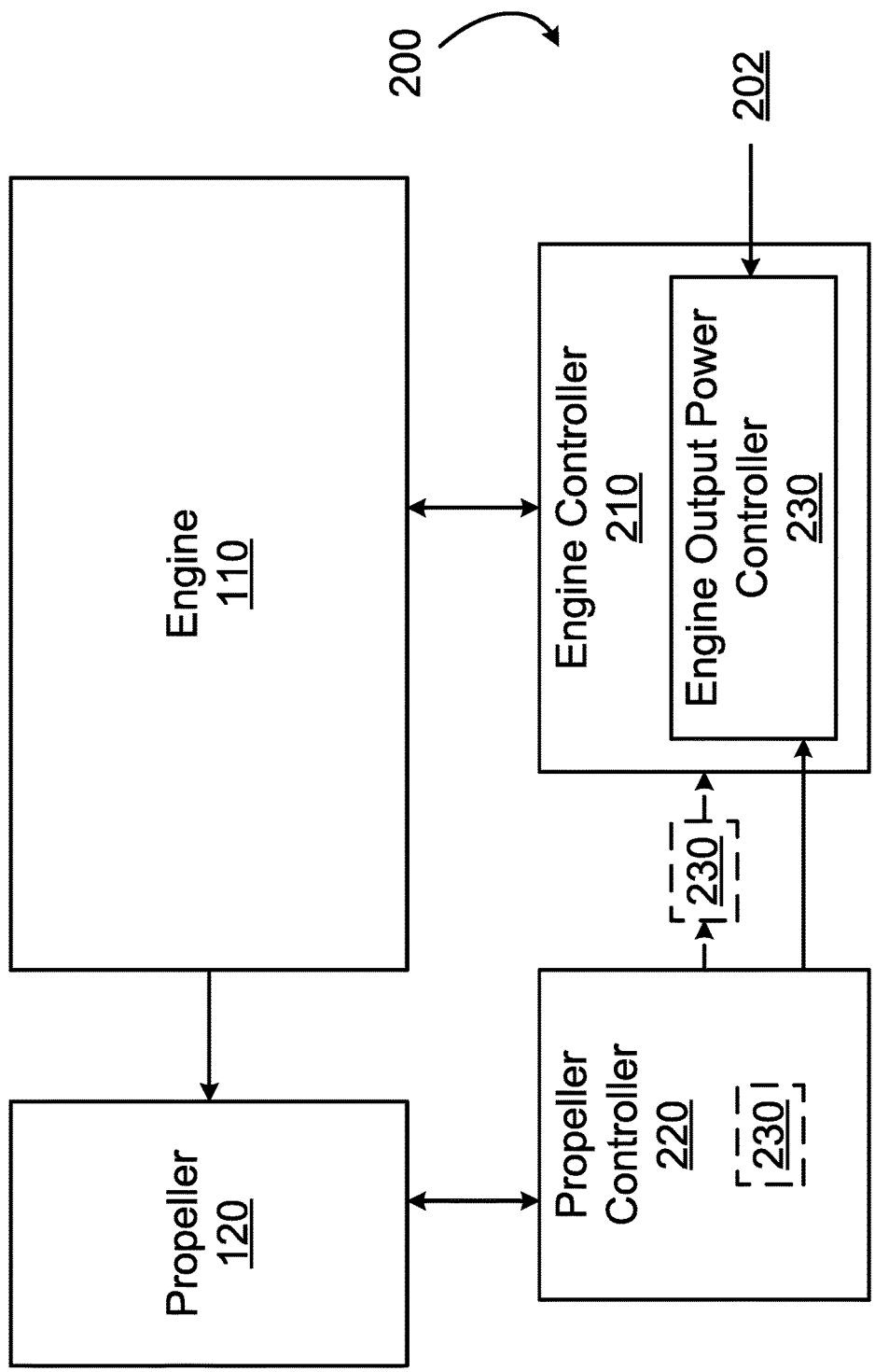
FIGS. 2A-B are block diagrams of example powerplant control systems.
Figure 2B:
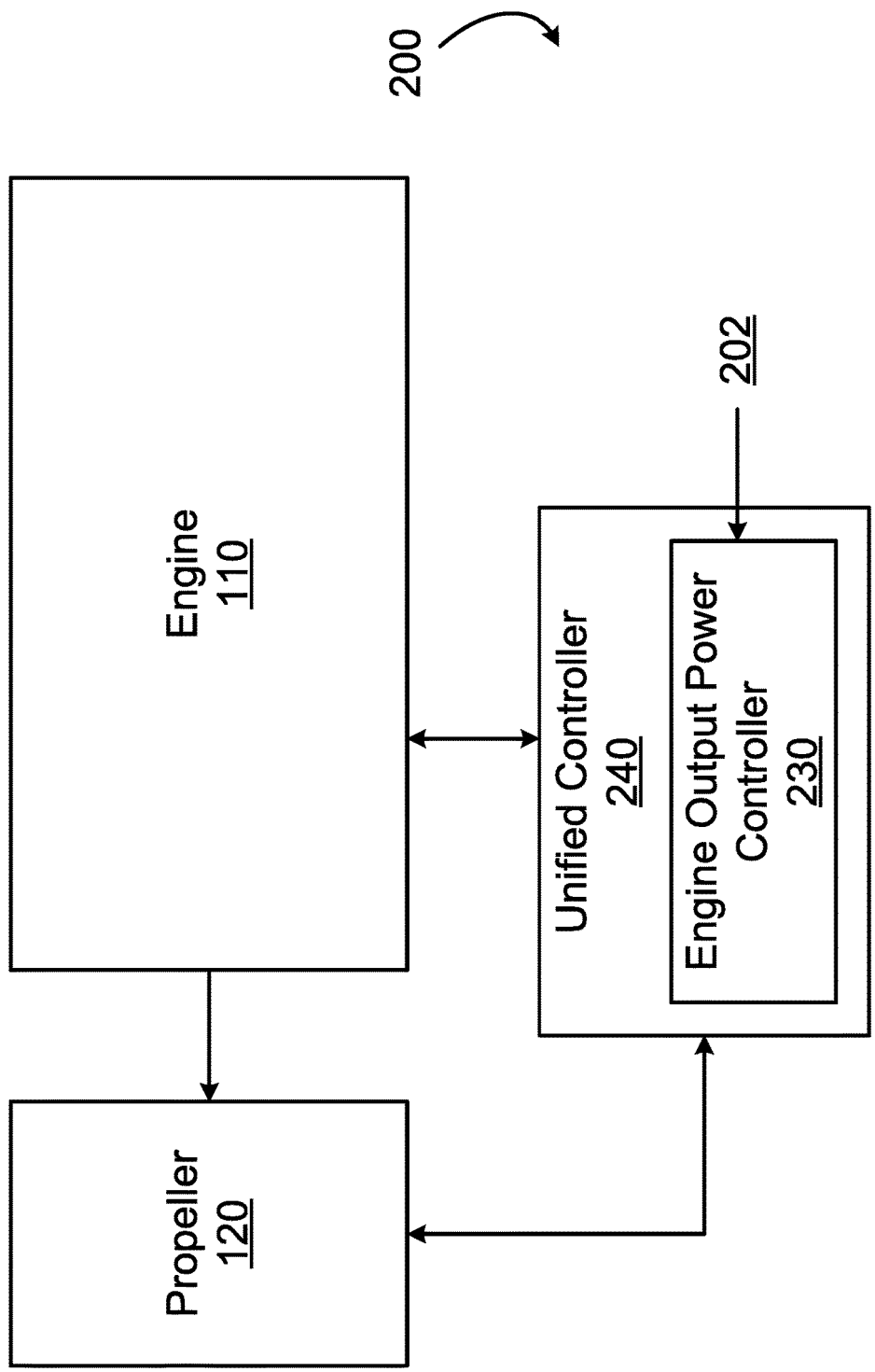

With reference to FIG. 2B, in some embodiments the powerplant control system 200 includes a unified controller 240 which controls operation of both the engine 110 and the propeller 120, at least combining the functionality of the engine controller 210 and the propeller controller 220 as described hereinabove. The unified controller 240 includes the engine output power controller 230.

In either of the embodiments shown in FIGS. 2A and 2B, the engine output power controller 230 is configured for obtaining a plurality of inputs 202 which are indicative of various engine power limits, for example as associated with a mechanical limit and with a thermal limit of the engine 110. The inputs 202 may be obtained in any suitable way, for example via a lookup table or other storage medium (not illustrated). In some embodiments, the engine power limits associated with the mechanical limit and/or the thermal limit of the engine 110 vary as a function of a dynamically-varying condition external to the aircraft, such as external temperature, ambient pressure, and airspeed, and/or as a function of a dynamically-varying condition internal to the aircraft, such as environmental bleed air extraction. In such cases, the engine output power controller 230 is configured for obtaining the dynamically-varying condition, for example via a sensor (not illustrated), and for querying the lookup table with the condition to obtain the corresponding limit.

The engine output power controller 230 is configured for obtaining an input from the propeller controller 220. The input from the propeller controller 220 is indicative of an engine power limit associated with a thrust limit, that is to say a maximum amount of power supplied by the engine 110 to the propeller 120 which, when converted by the propeller 120 into thrust, sets a maximum amount of thrust which the propeller 120 can withstand. The engine power limit associated with the thrust limit is a limit on the amount of power the engine 110 can produce without causing damage to the power-plant 100, and more specifically to the propeller 120, by creating more thrust than the propeller 120 can tolerate. The engine power limit associated with the thrust limit can vary over time as various conditions external and internal to the aircraft change. In some embodiments, the engine output power controller 230 obtains an actual engine power limit associated with the thrust limit at a given moment in time. Thus, the engine power limit associated with the thrust limit is considered with the engine power limit associated with the mechanical limit and the engine power limit associated with the thermal limit to limit the amount of power the engine 110 can produce.

In some embodiments, the propeller controller 220 directly provides the engine power limit associated with the thrust limit to the engine output power controller 230. In other embodiments, the propeller controller 220 provides the engine output power controller 230 with the propeller rotation speed and blade pitch angle, and the engine output power controller 230 can perform a thrust limit calculation to determine the actual engine power limit associated with the thrust limit. Thus, the propeller controller 220 obtains the engine output power from the propeller 120 or sensors thereof (not illustrated) and provides the engine output power to the engine output power controller 230. The engine output power controller 230 then uses a thrust prediction algorithm to convert the engine output power into a predicted thrust value. The predicted thrust value is then compared to a maximum allowable thrust value, and the engine power limit associated with the thrust limit can be determined by interpolating the predicted thrust value and the maximum allowable thrust value. In some cases, the predicted thrust value is an estimate having a level of uncertainty, and the engine power limit associated with the thrust limit can be selected as a lower bound of the uncertainty, an upper bound of the uncertainty, a midpoint thereof, or any other value within the uncertainty.

The actual engine power limit associated with the thrust limit can also depend on a variety of factors internal and external to the aircraft. In some embodiments, the actual engine power limit associated with the thrust limit depends on at least one condition external to the aircraft, for example a forward airspeed, an operating altitude, and/or an ambient temperature. In other embodiments, the engine power limit associated with the actual thrust limit depends on at least one propeller operating condition, for example a propeller rotational speed, a propeller blade pitch angle, and/or a propeller blade efficiency. Thus, the thrust prediction algorithm can use any suitable external and/or internal conditions of the aircraft along with the engine output power when determining the actual engine power limit associated with the thrust limit. In some embodiments, the actual engine power limit associated with the thrust limit can be obtained from a lookup table which takes any suitable number of dynamically-varying inputs, including the engine output power and any number of conditions, and provides the actual engine power limit associated with the thrust limit based on the dynamically-varying inputs.

Figure 3:
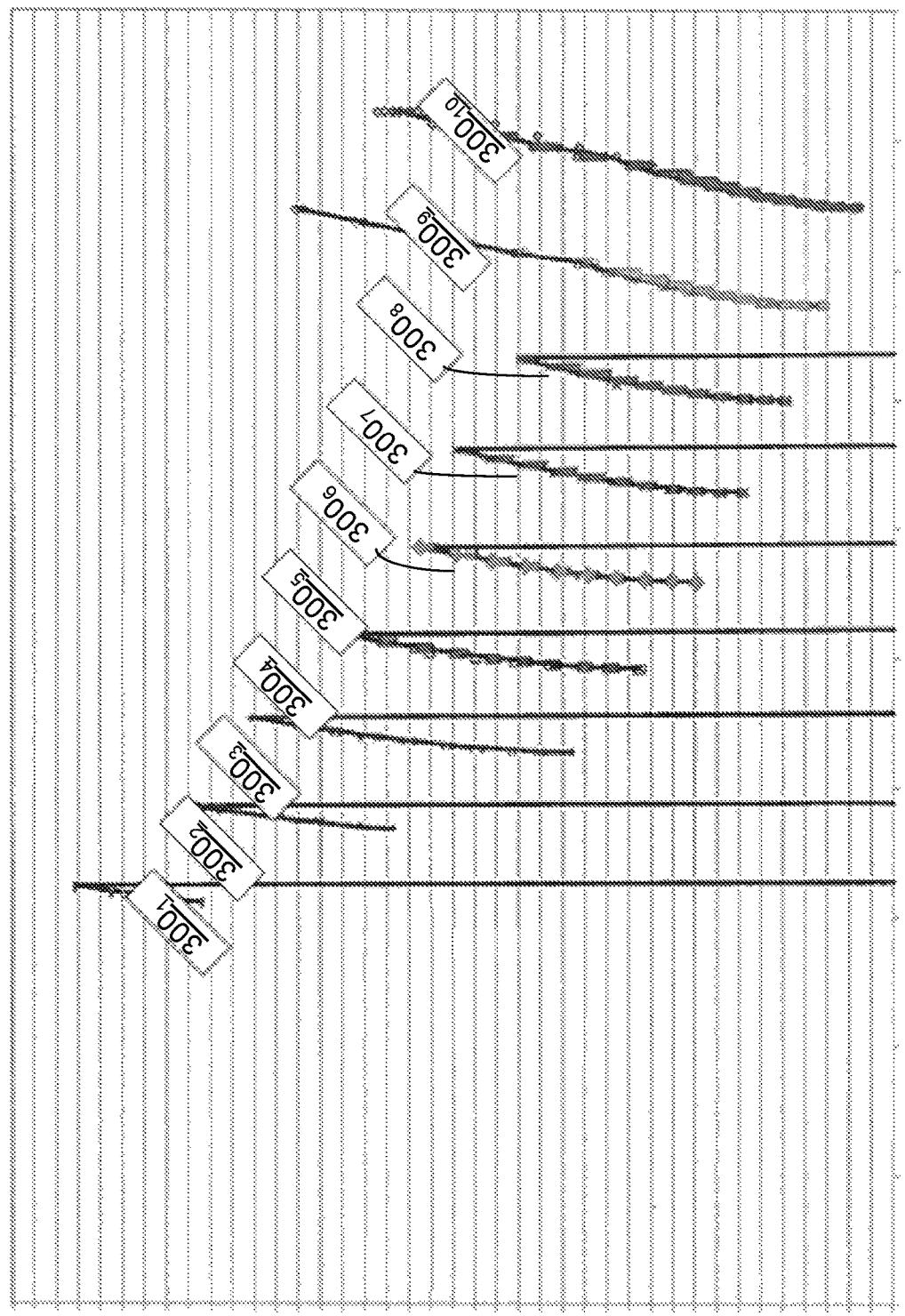
FIG. 3 is a graphical representation of example thrust limit curves.

With reference to FIG. 3, in some embodiments the engine power limit associated with the thrust limit depends on a normalized ambient pressure and an aircraft altitude. As illustrated in FIG. 3, a plurality of thrust limit curves $400_1$-$400_{10}$ can be produced, each representing a different altitude or altitude range, and each varying with respect to normalized ambient pressure (x-axis). In other embodiments, the engine power limit associated with the thrust limit additionally depends on a normalized temperature, and is a function $f$ which can be expressed via the following equation:

$$\frac{SHP_{FNPMAX}}{\delta_{15}^x \times \sqrt[y]{\theta_{15}}} = f(\delta_{15}, P_{amb})$$

wherein $SHP_{FNPMAX}$ is the net thrust or force at the propeller as determined by the thrust prediction algorithm, $\delta_{15}$ is the sea-level-normalized engine inlet pressure, $\theta_{15}$ is the sea-level-normalized engine inlet temperature, and $P_{amb}$ is an ambient pressure.

In embodiments where the engine output power controller 230 is part of the propeller controller 220, the engine output power controller 230 can obtain the engine power limit associated with the thrust limit by calculating it as described hereinabove. In embodiments where the engine output power controller 230 is a separate entity, the engine output power controller 230 can obtain the engine power limit associated with the thrust limit either as calculated by the propeller controller 220, as calculated by the engine controller 210, or can perform the thrust limit calculation itself based on the engine output power as obtained from the propeller controller 220 or the engine controller 210. In either case, the engine output power controller 230 can obtain the engine power limit associated with the mechanical limit and the engine power limit associated with the thermal limit from the lookup table as described hereinabove or from any other suitable source.

Figure 4:
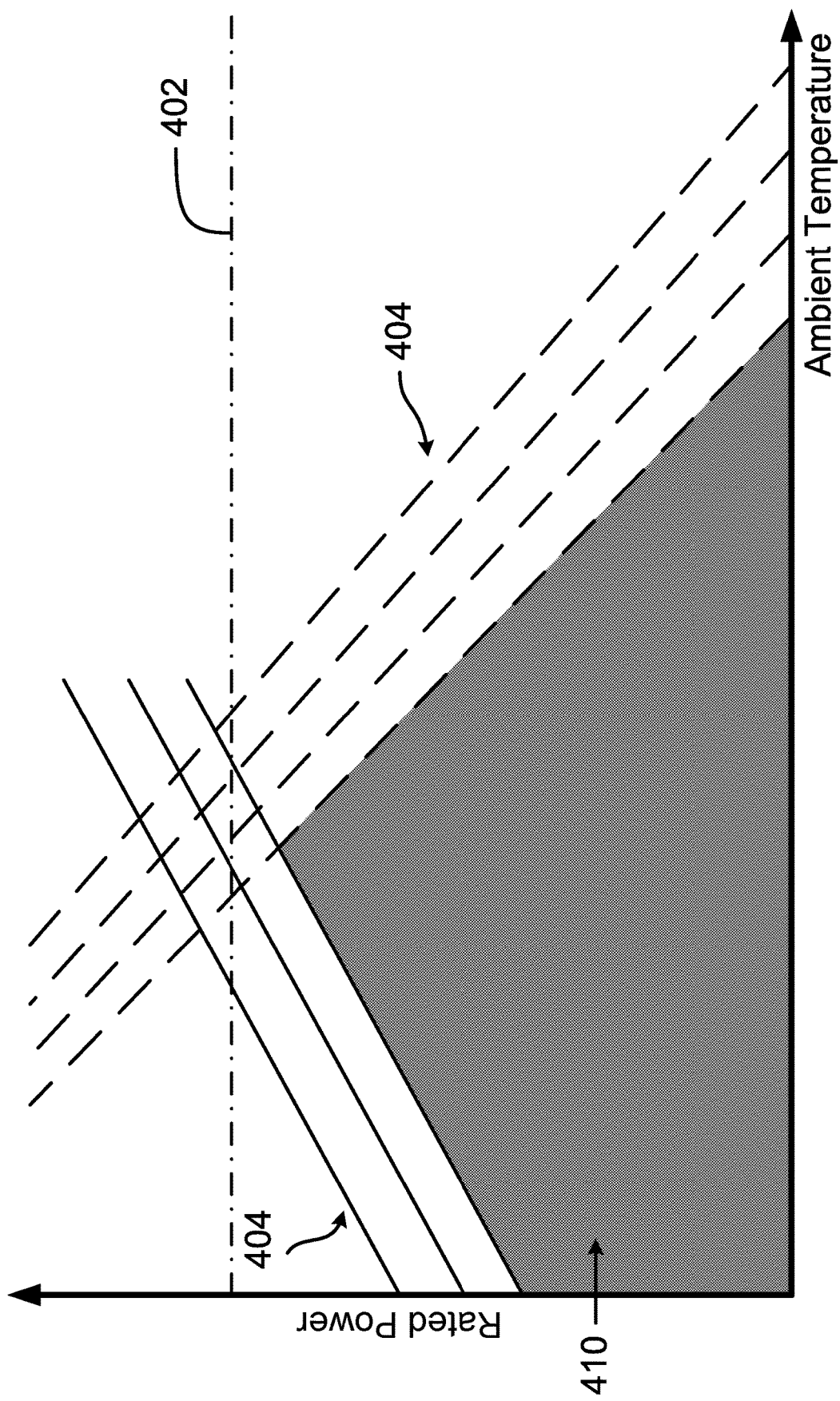
FIG. 4 is a graphical illustration of example mechanical, thermal, and thrust limits.

Thus, and with reference to FIG. 4, the engine output power controller 230 is configured for obtaining the engine power limits associated with the mechanical limit, the thermal limit, and the thrust limit. The engine output power controller 230 is further configured for comparing the engine power limit associated with the thrust limit to the engine power limit associated with the mechanical limit and to the engine power limit associated with the thermal limit and for setting a maximum engine power limit at a lowest value of the three engine power limits. For example, the engine power limits associated with the mechanical, thermal, and thrust limits can be visualized as a plurality of inequalities defining an operating space 410 for the engine 110 which satisfies each of the limits. Thus, the engine power limit associated with the mechanical limit is shown as line 402, the engine power limit associated with the thermal limit can be any one of lines 404, depending on the ambient temperature and/or pressure, for example, and the engine power limit associated with the thrust limit at a given moment in time can be any one of lines 406. In this example, the engine power limits associated with the mechanical limit, the thermal limit, and the thrust limits are shown as varying with ambient temperature, but the engine power limits may also vary with ambient pressure, airspeed, and the like. The engine power limit associated with the thermal limit can be any one of the lines 404 depending on other factors external to the aircraft, including ambient pressure and/or airspeed. Similarly, the engine power limit associated with the thrust limit can vary with ambient temperature, ambient pressure, airspeed, and the like. Setting the maximum engine power limit at the lowest value of the engine power limits associated with the mechanical limit, the thermal limit, and the thrust limit is thus done by choosing which of the lines 402, 404, and 406 has the lowest value for a current value of the ambient temperature. In other embodiments, the engine power limits associated with the mechanical limit, the thermal limit, and the thrust limit vary with respect to other factors, or are calculated as values for a given temperature, and the comparison is done by comparing the values and choosing the lowest of the three.

The maximum engine power limit can then applied as the engine power limit. In some embodiments, the engine output power controller 230 can apply the maximum engine power limit directly to the engine 110. In other embodiments, the engine output power controller 230 provides a message to the engine controller 210 indicative of the maximum engine power limit, and causes the engine controller 210 to apply the maximum engine power limit. In some embodiments, the engine output power controller 230 is configured for instructing the engine controller 210 to lower a fuel flow to the engine 110 as a function of the selected limit.

The engine output power controller 230 therefore provides a mechanism for limiting the power of the engine to a lowest value of the engine power limits associated with the mechanical limit, the thermal limit, and the thrust limit, ensuring that the engine 110 does not operate at a level which could cause mechanical or thermal damage to the engine 110 itself, or damage to the propeller 120 by generating thrust at a level beyond what the propeller 120 can withstand.

Figure 5:
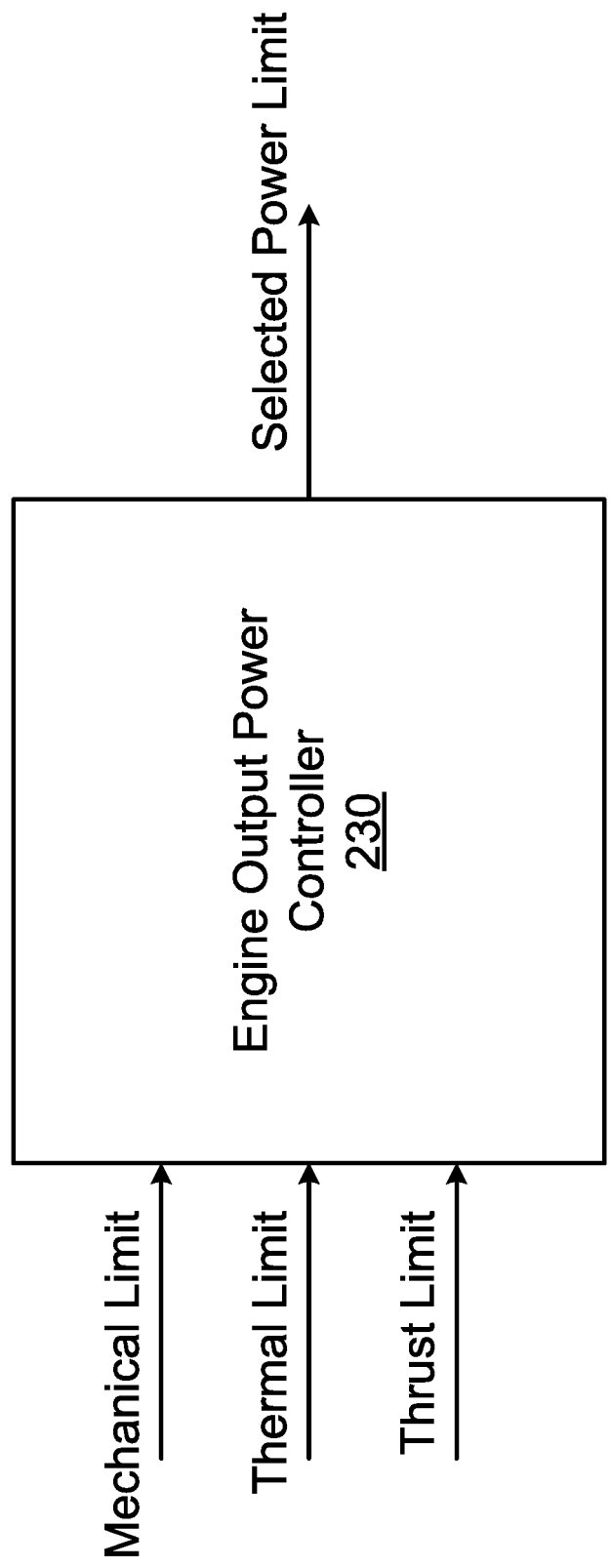
FIG. 5 is a signal diagram of an example engine output power controller.

FIG. 5 schematically illustrates an embodiment of the engine output power controller 230. The controller 230 receives as inputs the engine power limits associated with a mechanical limit, a thermal limit, and a thrust limit, and outputs a maximum engine power limit. In some embodiments, controller 230 receives an engine output power reading or other intermediary value and converts this value into the engine power limit associated with the thrust limit. The controller 230 is thus configured for obtaining the engine power limits associated with the mechanical, thermal, and thrust limits. Once obtained, the system 300 compares the engine power limit associated with the thrust limit to the engine power limits associated with the mechanical limit and the thermal limit and sets a maximum engine power limit at a lowest value of the three engine power limits. The selected limit is then applied as an engine power limit to the engine 110.

Figure 6:
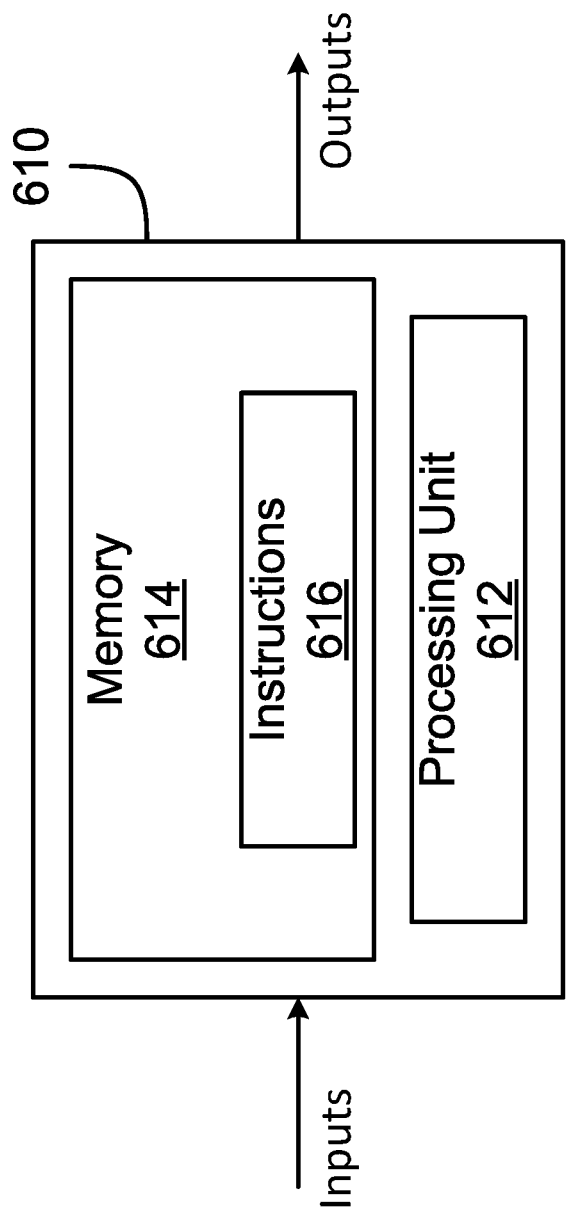
FIG. 6 is a schematic diagram of an example computing system for implementing the engine output power controller of FIG. 5 in accordance with an embodiment.

With reference to FIG. 6, the engine output power controller 230 may be implemented by a computing device 610, comprising a processing unit 612 and a memory 614 which has stored therein computer-executable instructions 616. The processing unit 612 may comprise any suitable devices configured to implement the system 300 such that instructions 616, when executed by the computing device 610 or other programmable apparatus, may cause the functions/acts/steps attributed to the system 300 as described herein to be executed. The processing unit 612 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 614 may comprise any suitable known or other machine-readable storage medium. The memory 614 may comprise non-transitory computer readable storage medium, for example, but not limited to, an electronic, magnetic, optical, electromagnetic, infrared, or semiconductor system, apparatus, or device, or any suitable combination of the foregoing. The memory 614 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 614 may comprise any storage means (e.g., devices) suitable for retrievably storing machine-readable instructions 616 executable by processing unit 612.

Figure 7:
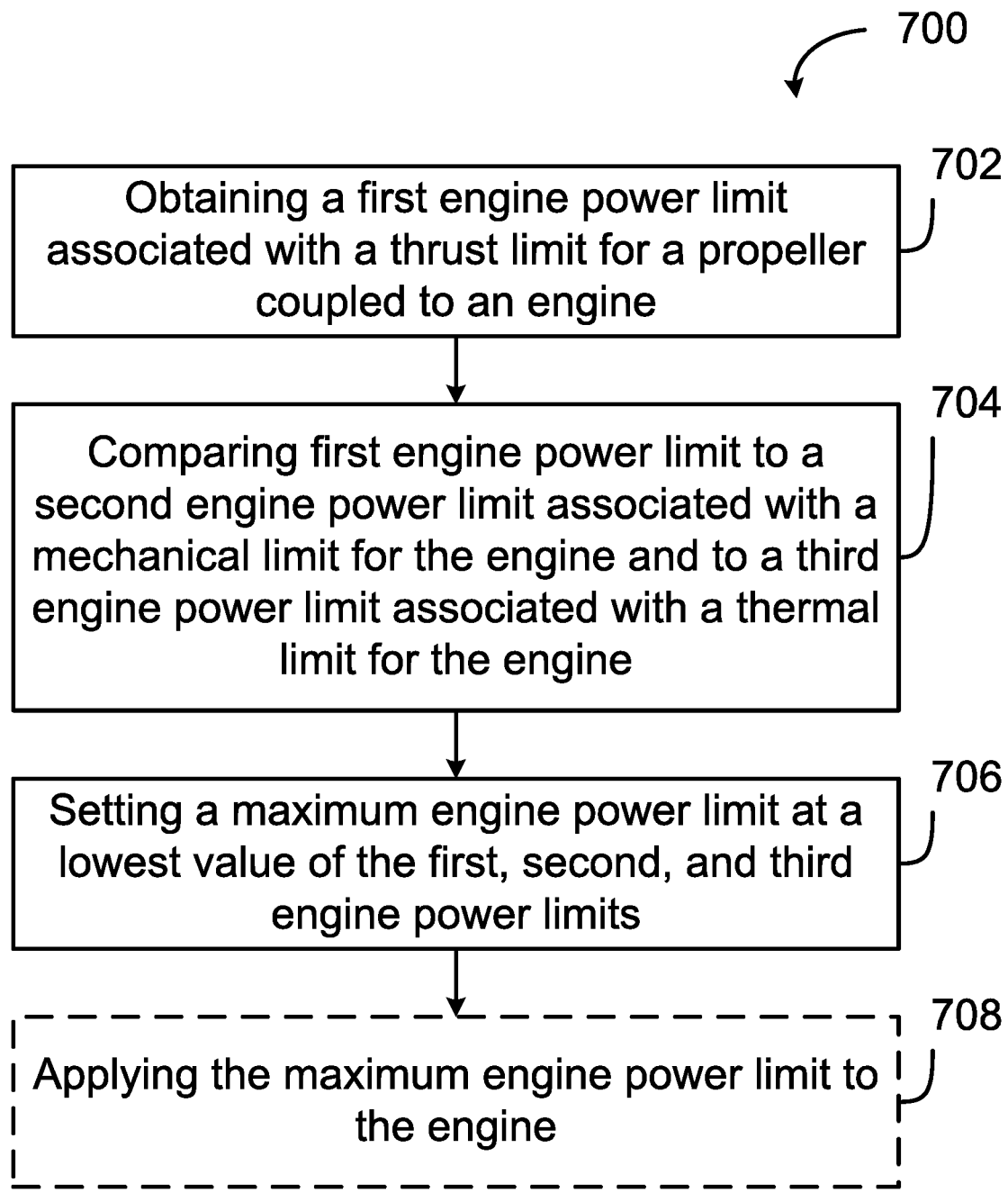
FIG. 7 is a flowchart illustrating an example method for controlling an engine output power in accordance with an embodiment.

With reference to FIG. 7, there is shown a flowchart illustrating an example method 700 for controlling operation of an engine of an aircraft. The method 700 can be implemented by the engine output power controller 230. At step 702, a first engine power limit associated with a thrust limit is obtained. As described hereinabove, the first engine power limit associated with the thrust limit may be obtained from another element, for example the propeller controller 210, or may be calculated by the engine output power controller 230 based on an engine output power and any other suitable values. In addition, the first engine power limit associated with the thrust limit may depend on any number of conditions external to the aircraft and/or various propeller operation conditions and be determined dynamically.

At step 704, the first engine power limit is compared to a second engine power limit associated with a mechanical limit for the engine and to a third engine power limit associated with a thermal limit for the engine. At step 706, maximum engine power limit is set at a lowest value of the first, second, and third engine power limits. The comparing and setting can be performed by the engine output power controller 230 using any suitable algorithms or logic. Optionally, at step 708, the maximum engine power limit is applied to an engine to control operation of the engine of the aircraft, for example engine 110.

Because the engine power limits associated with the thrust limit, and optionally the thermal and/or mechanical limits, vary dynamically, in some embodiments, the controller 230 may repeat the method 700 on a regular, semi-regular, or an ad-hoc basis to adjust the engine power limit. For example, the method 700 is repeated every few seconds or every few minutes during certain times of aircraft operation, such as during takeoff. In another example, the method 700 is performed every time a change in a condition external to the aircraft is detected, such as a change in temperature or altitude. Other triggers for repeating the method 700 are also considered. Thus, the method 700 may be first performed to determine a first engine power limit associated with a first thrust limit to set a first maximum engine power limit, and may be performed a second time to determine a subsequent or updated engine power limit associated with an updated thrust limit and to set an updated maximum engine power limit. The method 700 may be repeated any suitable number of times, as may be appropriate.

The methods and systems for controlling operation of aircraft engines described herein may be implemented in a high level procedural or object oriented programming or scripting language, or a combination thereof, to communicate with or assist in the operation of a computer system, for example the computing device 600. Alternatively, the methods and systems for controlling operation of aircraft engines may be implemented in assembly or machine language. The language may be a compiled or interpreted language. Program code for implementing the methods and systems for controlling operation of aircraft engines may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling operation of aircraft engines may also be considered to be implemented by way of a non-transitory computer-readable storage medium having a computer program stored thereon. The computer program may comprise computer-readable instructions which cause a computer, or more specifically the processing unit 612 of the computing device 600, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. For example, other factors may be considered when determining the engine power limit associated with the thrust limit. Still other modifications which fall within the scope of the present invention will be apparent to those skilled in the art, in light of a review of this disclosure.

Various aspects of the methods and systems for controlling operation of aircraft engines may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A computer-implemented method for controlling operation of an engine of an aircraft, comprising:
    obtaining, at a controller of the engine, a first engine power limit associated with a thrust limit of a propeller coupled to the engine;
    comparing, at the controller, the first engine power limit to a second engine power limit associated with a mechanical limit for the engine and to a third engine power limit associated with a thermal limit for the engine;
    selecting, at the controller, from the first engine power limit, the second engine power limit, and the third engine power limit the one having a lowest value; and
    setting a maximum engine power limit of the engine to the selected one of the first, second, and third engine power limits.

2. The method of claim 1, wherein obtaining the first engine power limit comprises receiving the first engine power limit from a propeller control system.

3. The method of claim 1, wherein obtaining the first engine power limit comprises:
    obtaining an engine output power for the engine while in operation; and
    determining the first engine power limit based on the engine output power and at least one external aircraft condition.

4. The method of claim 3, wherein the at least one external aircraft condition comprises at least one of a forward airspeed, an operating altitude, and an ambient temperature.

5. The method of claim 3, further comprising receiving at least one propeller operation condition, wherein determining the first engine power limit is based on the engine output power, the at least one external aircraft condition, and the at least one propeller operation condition.

6. The method of claim 5, wherein the at least one propeller operation condition comprises at least one of a propeller rotational speed, a propeller blade pitch angle, and a propeller blade efficiency.

7. The method of claim 3, wherein obtaining the engine output power comprises receiving, at an engine control system, the engine output power from a propeller control system, wherein the determining, comparing, and setting is performed by the engine control system.

8. The method of claim 1, further comprising determining at least one of the second and third engine power limits from a lookup table based on at least one external aircraft condition.

9. The method of claim 8, wherein determining at least one of the second and third engine power limits comprises dynamically determining the third power limit based on changes to the at least one external aircraft condition.

10. The method of claim 1, further comprising:
    obtaining an updated first engine power limit;
    comparing the updated first engine power limit to the second and third engine power limits; and
    setting the maximum engine power limit at a lowest value of the updated first engine power limit, the second engine power limit, and the third engine power limit.

11. A system for controlling operation of an engine of an aircraft, comprising:
    a processing unit; and
    a non-transitory computer-readable memory having stored thereon program instructions executable by the processing unit for:
        obtaining, at a controller of the engine, a first engine power limit associated with a thrust limit for a propeller coupled to the engine;
        comparing, at the controller, the first engine power limit to a second engine power limit associated with a mechanical limit for the engine and to a third engine power limit associated with a thermal limit for the engine;
        selecting, at the controller, from the first engine power limit, the second engine power limit, and the third engine power limit the one having a lowest value; and
        setting a maximum engine power limit of the engine to the selected one of the first, second, and third engine power limits.

12. The system of claim 11, wherein obtaining the first engine power limit comprises receiving the first engine power limit from a propeller control system.

13. The system of claim 11, wherein obtaining the first engine power limit comprises:
   obtaining an engine output power for the engine while in operation; and
   determining the first engine power limit based on the engine output power and at least one external aircraft condition.

14. The system of claim 13, wherein the at least one external aircraft condition comprises at least one of a forward airspeed, an operating altitude, and an ambient temperature.

15. The system of claim 13, wherein the program instructions are further executable by the processing unit for receiving at least one propeller operation condition, wherein determining the first engine power limit is based on the engine output power, the at least one external aircraft condition, and the at least one propeller operation condition.

16. The system of claim 15, wherein the at least one propeller operation condition comprises at least one of a propeller rotational speed, a propeller blade pitch angle, and a propeller blade efficiency.

17. The system of claim 13, wherein obtaining the engine output power comprises receiving, at an engine control system, the engine output power from a propeller control system, wherein the determining, comparing, and setting is performed by the engine control system.

18. The system of claim 11, wherein the program instructions are further executable by the processing unit for determining at least one of the second and third engine power limits from a lookup table based on at least one external aircraft condition.

19. The system of claim 18, wherein determining at least one of the second and third engine power limits comprises dynamically determining the third engine power limit based on changes to the at least one external aircraft condition.

20. The system of claim 11, wherein the program instructions are further executable by the processing unit for:
   obtaining an updated first engine power limit for the engine;
   comparing the updated first engine power limit to the second and third engine power limits; and
   setting the maximum engine power limit at a lowest value of the updated first engine power limit, the second engine power limit, and the third engine power limit.

* * * * *